UNITED STATES PATENT OFFICE.

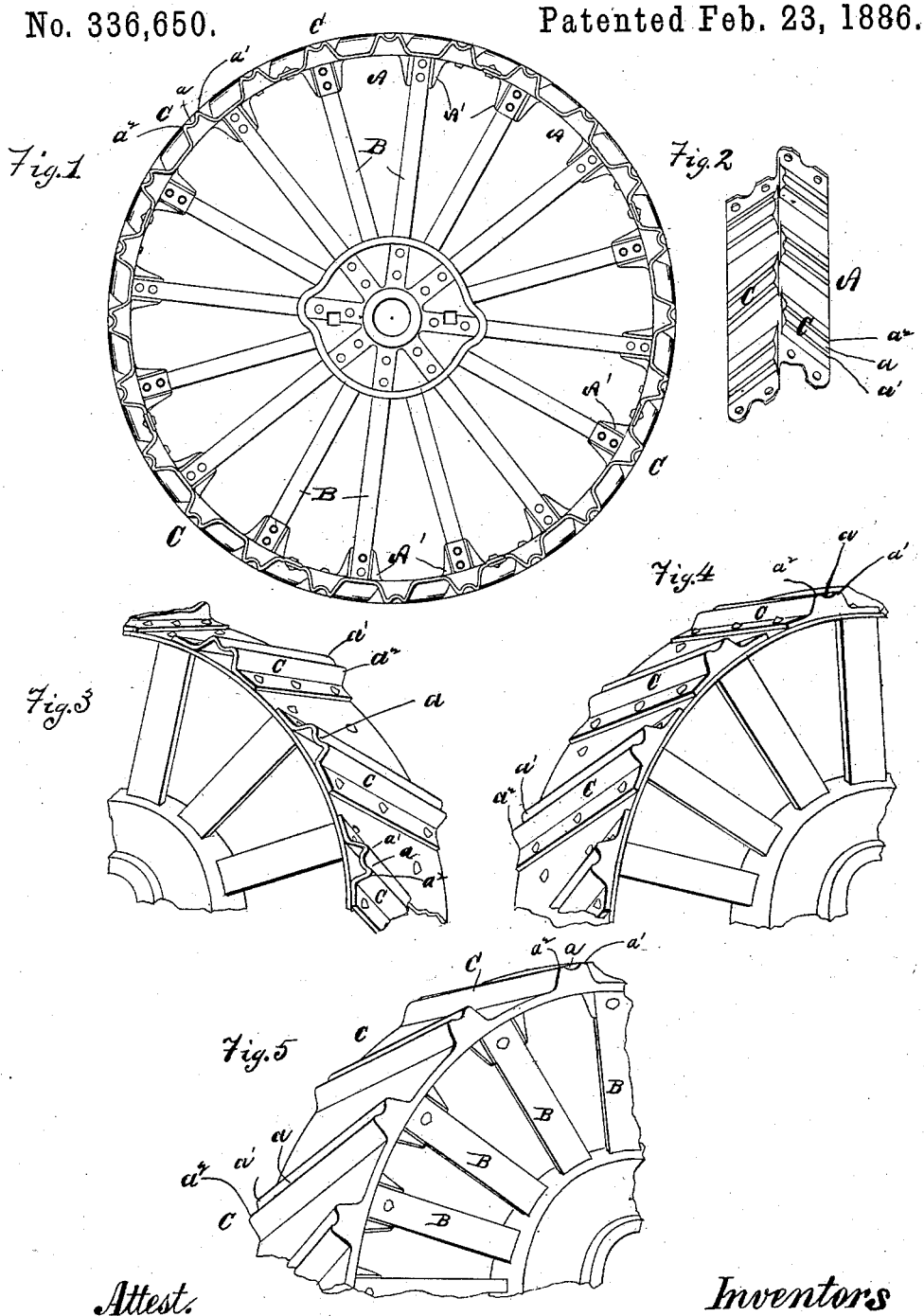

OLIVER W. KELLY AND LOUIS F. DIETER, OF SPRINGFIELD, OHIO, ASSIGNORS TO THE SPRINGFIELD ENGINE AND THRESHER COMPANY, OF SAME PLACE.

TRACTION-WHEEL.

SPECIFICATION forming part of Letters Patent No. 336,650, dated February 23, 1886.

Application filed September 1, 1885. Serial No. 175,932. (No model.)

*To all whom it may concern:*

Be it known that we, OLIVER W. KELLY and LOUIS F. DIETER, citizens of the United States, residing at Springfield, in the county of Clark and State of Ohio, have invented certain new and useful Improvements in Traction-Wheels, of which the following is a specification.

Our invention relates to improvements in traction-wheels, and particularly relates to the wheels of traction-engines. It is customary in traction-wheels of this class to provide on the periphery thereof a series of projections or cleats to prevent the wheel from slipping. For hard smooth roads it is desirable to have the said cleats small, so that a greater tractive force may be exerted thereon without slipping, while for soft ground it is desirable to have the cleats large. The wheels are usually made with small cleats for general use, additional cleats or "mud-hooks" being added thereto when it is desired to run the engine in soft ground.

The object of our invention is to provide a traction-wheel having cleats of a peculiar construction, whereby the wheel is adapted for either soft or hard ground. We attain this object by the constructions shown in the accompanying drawings, in which—

Figure 1 is a side elevation view of a wheel embodying our invention, the said wheel being made in sections. Fig. 2 is a plan view of one of the sections of the same in detail. Figs. 3, 4, and 5 are each perspective views showing modifications of our invention.

We preferably make the wheel in sections A, as shown in Fig. 1, each of said sections being provided with lugs A' on the inner side thereof, to which the spokes B are secured. The sections are preferably cast of malleable iron, and the cleats C are cast thereon. These cleats C we make of considerable depth, and on the outer face thereof we provide a small depression or groove, $a$, extending longitudinally through the center of the said cleat, thus forming two small auxiliary cleats, $a'$ $a^2$, on each of the main cleats. These small auxiliary cleats $a'$ $a^2$ form the cleat proper, and prevent the slipping of the wheel on hard smooth ground. In soft ground, however, the earth presses into the groove $a$, filling it up, and thus presents the entire face of the main cleat C for the wheel to rest upon. These main cleats C, being of considerable depth, take a firm hold in soft ground, so that the addition of mud-hooks is unnecessary, the main cleats themselves being in the nature of mud-hooks.

In Fig. 3 the cleats C are shown made separate from the tire and riveted thereon, the said cleats being hollowed out on the under side. In this form the cleats may be either made from wrought metal formed to the proper shape or they may be cast from steel or malleable iron.

In Fig. 4 the cleats are also shown separate from the tire, but are cast solid.

In Fig. 5 the cleats are shown rolled or cast integral with the tire or rim, and solid.

A traction-wheel provided with cleats, as above described, it will be seen, is adapted to any kind of ground, and works equally well in hard or soft ground without slipping.

Having thus described our invention, we claim—

1. The combination, with a traction-wheel provided with a tire or rim having a solid or closed periphery, of cleats or projections on the outer surface or periphery thereof, and auxiliary points or cleats on the outer face of said main cleats or projections, substantially as and for the purpose set forth.

2. In a traction-wheel, a tire or rim composed of sections, said rim being provided with a series of main cleats or projections having auxiliary cleats thereon, said cleats being formed integral with said sections and hollow or open on their under side, so that a uniform thickness of metal is obtained throughout the section, substantially as specified.

3. A cleat for a traction-wheel having the groove or depression $a$ and the auxiliary cleats or points, substantially as specified.

In testimony whereof we have hereunto set our hand this 28th day of August, A. D. 1885.

OLIVER W. KELLY.
LOUIS F. DIETER.

Witnesses:
CHASE STEWART,
PAUL A. STALEY.